(12) United States Patent
Banus Garcia et al.

(10) Patent No.: US 11,041,488 B2
(45) Date of Patent: Jun. 22, 2021

(54) SYSTEM COMPRISING TWO OR MORE PUMPS CONNECTED IN PARALLEL AND A PRESSURE SWITCH CONCEIVED TO OPERATE IN SAID SYSTEM

(71) Applicant: COELBO CONTROL SYSTEM, S.L., Barcelona (ES)

(72) Inventors: Fernando Banus Garcia, Barcelona (ES); Jaume Buch Llorach, Barcelona (ES); Angel Andres Castellano, Barcelona (ES)

(73) Assignee: COELBO CONTROL SYSTEM, S.L., Barcelona (ES)

( * ) Notice: Subject to any disclaimer, the term of this patent is extended or adjusted under 35 U.S.C. 154(b) by 36 days.

(21) Appl. No.: 16/342,492

(22) PCT Filed: Oct. 18, 2017

(86) PCT No.: PCT/ES2017/070692
§ 371 (c)(1),
(2) Date: Apr. 16, 2019

(87) PCT Pub. No.: WO2018/073477
PCT Pub. Date: Apr. 26, 2018

(65) Prior Publication Data
US 2019/0257298 A1    Aug. 22, 2019

(30) Foreign Application Priority Data

Oct. 18, 2016   (ES) ................................ ES201631347

(51) Int. Cl.
F04B 23/04      (2006.01)
F04B 49/06      (2006.01)
(Continued)

(52) U.S. Cl.
CPC .............. *F04B 23/04* (2013.01); *F04B 49/06* (2013.01); *F04B 49/08* (2013.01); *F04D 15/029* (2013.01); *F04D 25/16* (2013.01); *G05D 16/20* (2013.01)

(58) Field of Classification Search
CPC ........ F04B 23/04; F04B 49/022; F04B 49/06; F04B 49/08; F04D 25/16
(Continued)

(56) References Cited

U.S. PATENT DOCUMENTS 3,463,382 A * 8/1969 Wusteney ............... F04B 49/02
                                                                        417/8
3,744,932 A * 7/1973 Prevett ..................... G05D 9/12
                                                                        417/8
(Continued)

FOREIGN PATENT DOCUMENTS

JP      H06241191       8/1994
JP      2006336560      12/2006

OTHER PUBLICATIONS

International Searching Authority, "International Search Report," issued in corresponding international application No. PCT/ES2017/070692, dated Feb. 16, 2018 (14 pages).

*Primary Examiner* — Christopher S Bobish
(74) *Attorney, Agent, or Firm* — Loeb & Loeb, LLP

(57) ABSTRACT

System with two pumps (B1, B2) connected in parallel to a delivery manifold and respective electronic pressure switches (P1, P2) provided with a pressure sensor (S1, S2) connected to the delivery manifold and designed to alternate their operation between a first configuration with a first shut-down pressure (Pmax1) and a first start-up pressure (Pmin1) and a second configuration with a second shut-down pressure (Pmax2) and a second start-up pressure (Pmin2), the first shut-down pressure (Pmax1) being greater than the second shut-down pressure (Pmax2) and the first
(Continued)

start-up pressure (Pmin1) greater than the second start-up pressure (Pmin2). Each of the pressure switches (P1, P2) is designed to alternate their operation between the two configurations according to a pressure reading (Pimp) at the delivery manifold by the pressure sensor(s) (S1, S2). The invention also relates to a pressure switch.

9 Claims, 7 Drawing Sheets

(51) Int. Cl.
*F04B 49/08* (2006.01)
*F04D 25/16* (2006.01)
*F04D 15/02* (2006.01)
*G05D 16/20* (2006.01)

(58) Field of Classification Search
USPC .......................................................... 417/7, 8
See application file for complete search history.

(56) References Cited

U.S. PATENT DOCUMENTS

| | | | |
|---|---|---|---|
| 4,179,242 A * | 12/1979 | Tateshita | G05D 9/12 417/12 |
| 4,437,811 A * | 3/1984 | Iwata | F04D 15/029 417/36 |
| 4,444,545 A | 4/1984 | Sanders et al. | |
| 4,551,068 A * | 11/1985 | Boudreaux | G05D 9/12 137/392 |
| 4,652,802 A * | 3/1987 | Johnston | F04B 49/025 137/395 |
| 5,449,274 A * | 9/1995 | Kochan, Jr. | F04D 15/0218 417/12 |
| 5,639,218 A * | 6/1997 | Tanino | F04B 9/1172 417/3 |
| 6,142,740 A * | 11/2000 | Connell | F04B 41/06 417/2 |
| 6,186,743 B1 * | 2/2001 | Romer | F04B 41/06 361/191 |
| 6,419,454 B1 * | 7/2002 | Christiansen | F04B 49/065 417/12 |
| 8,235,674 B1 * | 8/2012 | Bhattacharya | F04B 49/03 417/46 |
| 8,777,584 B2 * | 7/2014 | Mehr | F04B 23/04 417/8 |
| 9,995,293 B2 * | 6/2018 | Larsson | F04D 13/08 |
| 2004/0071554 A1 * | 4/2004 | Nybo | F04D 15/029 417/36 |
| 2013/0108478 A1 * | 5/2013 | Parkinson | F04B 49/065 417/53 |

* cited by examiner

SYSTEM COMPRISING TWO OR MORE PUMPS CONNECTED IN PARALLEL AND A PRESSURE SWITCH CONCEIVED TO OPERATE IN SAID SYSTEM

CROSS REFERENCE OF RELATED APPLICATIONS

The present invention is a US national stage of a PCT international application, serial no. PCT/ES2017/070692, filed on Oct. 18, 2017, which claims the pnority of Spanish patent application No. P 201631347, filed on Oct. 18, 2016 having an invention title of "SYSTEM COMPRISING TWO OR MORE PUMPS CONNECTED IN PARALLEL AND A PRESSURE SWITCH CONCEIVED TO OPERATE IN SAID SYSTEM", the entire content of these applications are incorporated into the present application by reference herein.

FIELD OF THE INVENTION

The present invention relates to the control of a pressure group provided with two or more pumps and their respective pressure switches, and aims to ensure optimal control and lifespan of the system.

BACKGROUND OF THE INVENTION

Systems equipped with two or more pumps connected in parallel and a delivery manifold to which the pump outputs are connected, which comprises respective pressure switches provided with means for measuring the pressure in the delivery manifold to control the operation of each pump, are known. In the case of mechanical pressure switches, the pressure is detected mechanically in the pressure switch itself, while in the case of an electronic pressure switch, it comprises a pressure sensor and an actuation relay.

These systems are designed to meet the demand when it has consumption peaks, since it is more efficient in terms of operations and costs to have two smaller pumps, which can operate in optimal conditions, instead of one that would be underused most of the time.

This implies, however, greater needs in terms of control.

In particular, it must be foreseen that the pressure switches have different start-up/shut-down pressure configurations, and in particular, it is necessary that one of the pumps has a first start-up pressure and a first shut-down pressure, while the other has a second start-up pressure and a second shut-down pressure, the first shut-down pressure being greater than the second shut-down pressure and the first start-up pressure being greater than the second start-up pressure, as shown in FIG. 1.

As is known, pumps usually operate with a boiler also connected to the delivery manifold, and the different shut-down/start-up pressures ensure the stability of the system.

What happens is the following. It is assumed that the system is at rest at a pressure comprised between the upper shut-down pressure (Pmax1) of the pumps and the upper start-up pressure (Pmin1). When a water demand occurs, the pressure in the delivery manifold begins to drop. By having a boiler, the pressure drop is gentler than if did not exist. When the first start-up pressure is reached (Pmin1), the first pump is starts to operate.

Then it may happen that the flow rate of this first pump is higher than the consumption that has caused its start-up, so that the pressure in the delivery tends to increase, the boiler is refilled, and the shut-down pressure of the first pump is reached. In other words, what happens is what would occur if there were only one pump and the second pump did not start to operate (FIG. 2).

Or it may happen that the flow of the first pump is not sufficient to satisfy the demand and that the pressure continues to fall until the second start-up pressure (Pmin2) is reached, such that the second pump starts to operate. In this case, if the system is correctly sized to respond to the demand peaks, the two pumps can satisfy the demand and re-fill the boiler. During the rise of the pressure in the manifold, the second shut-down pressure (Pmax2) will be reached first, at which time the second pump will shut down, and then the first shut-down pressure (Pmax1) will be reached, at which time the first pump will also shut down. This sequence is illustrated in FIG. 3.

The system just described, in which both mechanical and electronic pressure switches can be used, involves a very simple programming, by establishing the four pressure limits.

However, it has the obvious disadvantage that the first pump will work much more often than the other, which means that the system is not optimal in consideration of the life of the components, since the first pump will most likely fail long before the second.

In order to respond to this drawback, two solutions have been proposed, the first consisting of connecting the pumps or the pressure switches to a common plant and the second involving the use of independent electronic pressure switches equipped with means of communication between each other. Both solutions are complex, since the first involves having a plant for synchronisation, while the other involves connecting the pressure switches to each other. With both systems it is possible to alternate the pump configurations so that they end up supporting a similar workload.

The inventors consider that these solutions are expensive.

Two-pump systems are also known, one is a duty pump and the other a standby pump where one of the pumps acts as a standby pump in case of failure of the duty pump. It is a configuration in which they are become operational simultaneously. These systems have the disadvantage that the main pump ages and the standby pump remains without operating for a long time.

As a solution to this problem, enabling the system to alternate through a common plant so that the duty and standby pumps alternate in each operating cycle or in scheduled periods of time is known.

The inventors consider that this solution is expensive, since it involves the incorporation of a control plant of the two pumps.

DESCRIPTION OF THE INVENTION

In order to respond to the shortcomings of the state of the art, the present invention proposes a system comprising at least two pumps connected in parallel, a delivery manifold to which the outputs of the two or more pumps are connected, which comprises respective electronic pressure switches provided with a pressure sensor connected to the delivery manifold to control the operation of each pump, wherein the pressure switches are configured to alternate their operation between at least two start-up and shut-down pressure configurations, namely:
 a first configuration with a first shut-down pressure and a first start-up pressure;
 a second configuration with a second shut-down pressure and a second start-up pressure;

wherein the first shut-down pressure is greater than the second shut-down pressure and wherein the first start-up pressure is greater than the second start-up pressure, wherein the pressure switches are configured to perform said alternation according to a pressure reading of the delivery manifold with the pressure sensor(s).

By means of these features, it is possible to properly alternate the operation of two or more pumps, and ensure that each one of them has a similar accumulated workload, with which the lifespan of the system is increased. With respect to what is known, a system based on communication between pressure switches is substituted, whether or not an intermediate plant is used, by a system based on the monitoring of the common pressure along with the knowledge of the operating status of each pump for its corresponding pressure switch.

In particular, in the case of two pumps, each pressure switch will alternate its operation between the first and second shut-down and start-up pressures.

This concept substantially improves what is disclosed, for example, in U.S. Pat. No. 4,444,545, wherein a two-pump system coordinated by a common control device is described. In contrast, according to the present invention, no control centre is needed, since each pressure switch is equipped with a pressure sensor, such that from a pressure reading it is possible to know the system status parameters that need to be known.

In some embodiments, the pressure switches are configured to be put in the first configuration or in the second configuration when the pressure sensor indicates that the first shut-down pressure has been exceeded a predetermined number of times. In this way, if for any reason one of the pumps is started for a minimum number of consecutive times, the system will automatically assign the system a status that will enable the alternation between pumps to be restarted. In other words, if for some reason, for example due to errors in the pressure measurements, or due to pressures close to the threshold pressures, the two pumps begin to operate simultaneously with the same mode, when it is detected that one of them exceeds a number of consecutive start-ups, then it will establish which one will work with which pressure limits. The pressure switch that decides these situations will be designated as master, and the other as slave. Obviously, it is envisaged that the pressure switches, when configured after installation, can be programmed as a master or as a slave.

In some embodiments, the system comprises a boiler connected to the delivery manifold. In the vast majority of cases, as usual, the system will have a boiler, which allows the differences between the threshold pressures to significantly increase, and therefore avoid the uninterrupted start-up and shut-down of the pumps.

In some embodiments, each of the pressure switches is provided with a pressure sensor.

In some embodiments, the system comprises a common housing of the two pressure switches. In other words, the provision of the pressure switches in the system as separate units can be envisaged, which will be the most usual, or they can be provided integrated in a single housing, which will facilitate the installation thereof. In this case, it can also be foreseen that the programming is simpler, since the device itself can already decide which is the master unit.

The invention also relates to a pressure switch intended to be integrated in a system according to any of the variants described, and which is configured to alternate its operation between two configurations of shut-down and start-up pressure:

a first configuration with a first shut-down pressure and a first start-up pressure;

a second configuration with a second shut-down pressure and a second start-up pressure;

wherein the first shut-down pressure is greater than the second shut-down pressure and wherein the first start-up pressure is greater than the second start-up pressure, wherein the pressure switch is configured to perform said alternation according to a pressure reading of the delivery manifold with the pressure sensor.

The invention also relates to a system comprising two pumps connected in parallel, a drive manifold to which the outputs of the two pumps are connected, comprising electronic pressure switches provided with pressure sensors connected to the delivery manifold to control the operation of each pump, wherein the two pressure switches are configured with the same shut-down and start-up pressure, one of the electronic pressure switches being configured to operate as a master and the other electronic pressure switch being configured to operate as a slave, having the electronic pressure switch configured to operate as a master with a synchronisation pressure different than the synchronisation pressure of the electronic pressure switch configured to operate as a slave, the synchronisation pressures being lower than the start-up pressure, so that it is possible to return to an alternating operation configuration between pumps when the alternating configuration is lost.

With these features, it is possible to have a system that ensures an alternating operation, wherein only one or the other pump is in operation, without needing to have a control centre connected to the two pumps, or to the two pressure switches; instead, it is possible to ensure the alternation with only the pressure reading of the delivery manifold.

The asymmetry in the so-called synchronisation pressures are those that ensure re-synchronisation in case of the loss of synchronisation.

BRIEF DESCRIPTION OF THE FIGURES

To complement the description and for the purpose of aiding to better understand the features of the invention according to a practical exemplary embodiment thereof, a set of figures is attached as an integral part of the description in which the following has been depicted with an illustrative and non-limiting character.

DESCRIPTION OF AN EMBODIMENT OF THE INVENTION

Figure 5:
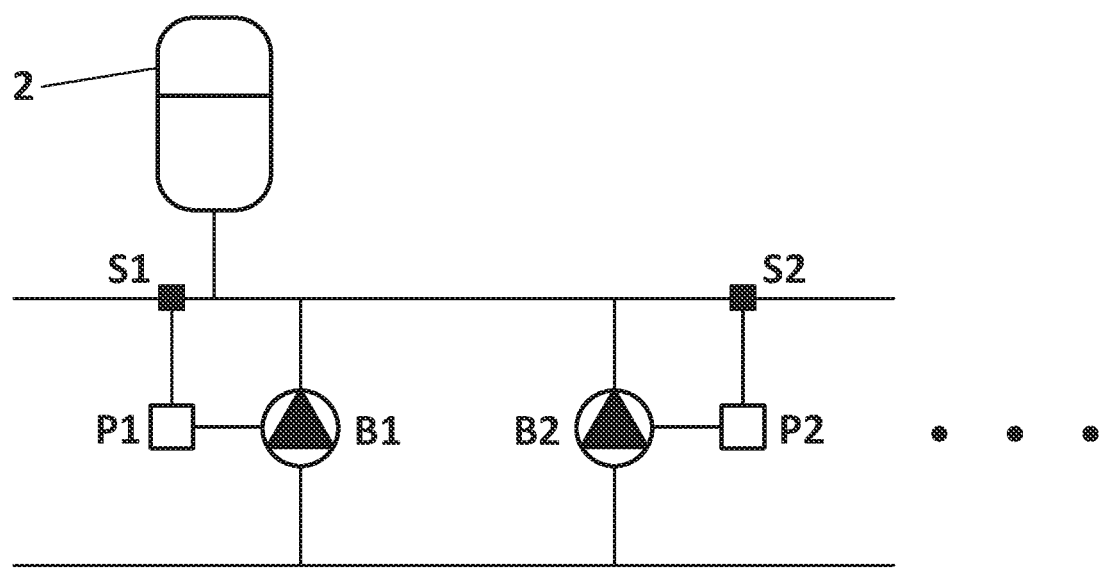
FIG. 5 shows a diagram of the installation provided with two pumps.

As can be seen in FIG. 5, according to a preferred embodiment, the invention relates to a system S comprising two pumps B1, B2 connected in parallel, a delivery manifold to which the outputs of the two pumps B1, B2 are connected, and comprising respective electronic pressure switches P1, P2 to control the operation of each pump B1, B2. The system is completed with a boiler 2 intended to ensure a greater stability in the pressure, such as for example a membrane boiler.

Each pressure switch is provided with a pressure sensor S1, S2 connected to the delivery manifold, so that they can measure the same pressure, or at most a pressure that will differ in the pressure loss between the two pressure points, if they are different. Obviously, we will try to ensure that the difference is minimal to ensure the correct operation of the system.

In particular, the pressure switches P1, P2 are configured to alternate their operation between two or more start-up pressure configurations Pmax1, Pmax2 and shut-down pressures Pmin1, Pmin2:
  a first configuration with a first shut-down pressure Pmax1 and a first start-up pressure Pmin1;
  a second configuration with a second shut-down pressure Pmax2 and a second start-up pressure Pmin2.

Therefore, each one of them will alternate their status between said two intervals. It should be noted that the numbering 1, 2 after the pressures does not imply that they are associated with one of the pressure switch pump groups, but on the contrary, each of the pumps will alternate its operation between these configurations, as will be clarified in the following.

Figure 1:
FIG. 1 is a schematic diagram showing the relationship between the start-up and shut-down pressures of two pumps arranged to operate in parallel.

As can be seen in FIG. 1, the first shut-down pressure Pmax1 is greater than the second shut-down pressure Pmax2 and the first start-up pressure Pmin1 is greater than the second start-up pressure Pmin2, which is known in the state of the art.

However, the novelty lies in that the pressure switches P1, P2 are configured to carry out said alternation according to a pressure reading Pimp in the delivery manifold with the pressure sensor(s) S1, S2.

During the initial configuration of the group, one of the pressure switches must be designated as master. This pressure switch will be responsible for managing the resynchronisation algorithms. The other pressure switch, or the others if the system comprises more than two, will be designated as slave.

As for the order of start-up of the pumps, the pump that operates between Pmax1 and Pmin1 is defined as the main one. The pump that operates between Pmax2 and Pmin2 is defined as auxiliary. If there were more auxiliary pumps, they would be defined following this logic.

During operation, both the master device and the slave/slaves can operate as main pump or auxiliary pump(s) due to alternating.

The initial configuration, in a group of two pumps, consists in that the first pump B1 has the status of operating with the first shut-down pressure Pmax1 and the first start-up pressure Pmin1 (master device operating as main) and the second pump has the status of operating with the second shut-down pressure Pmax2 and the second start-up pressure Pmin2 (slave device operating as auxiliary), the first shut-down pressure Pmax1 being greater than the second shut-down pressure Pmax2 and the first start-up pressure Pmin1 being greater than the second start-up pressure Pmin2. For example, Pmax1=3.5 bar, Pmin1=2.5 bar, Pmax2=3 bar and Pmin2=2 bar.

This may lead to the cases that are detailed below.

Figure 2:
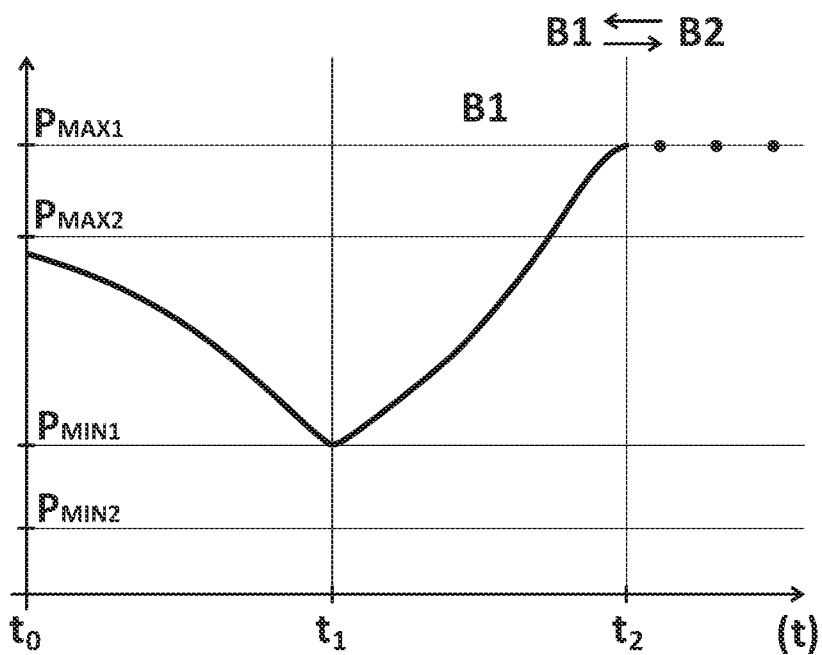
FIG. 2 shows the time evolution of the pressure in a sequence in which a single pump is started.

Case 1:

As can be seen in FIG. 2, first the pressure in the delivery manifold falls below Pmin1, which corresponds to t1. This causes the activation of the pump B1. If B1 has sufficient capacity, the pressure in the manifold will rise to Pmax1, and then B1 will shut down.

What constitutes the novelty of the invention is that the second pressure switch P2, associated with B2, will have monitored the pressure in the manifold and will have verified that the pressure has risen to Pmax1. Therefore, it will be possible to know which should be the first to start up in the next cycle. Moreover, the first pressure switch P1 will know that the pressure Pmax1 with B1 in operation has been reached. Then it will be possible to know which should be the second to start up, if necessary. The change of status configurations is represented by arrow B1⇆B2 at time t2.

Case 2:

If the first pump B1 has no capacity, the pressure will continue to decrease until Pmin2, moment (t2) when pump B2 will be activated. Then the pressure rises again and if the added flow is sufficient, first Pmax2 (time t3) will be reached, and the second pump B2 will shut down, B1 will continue working until reaching Pmax1, moment (time t4) when B1 will shut down. At the top of each time interval it is indicated which pumps are activated. This sequence corresponds to the case known and shown in FIG. 3.

Again, what constitutes the novelty of the invention is that the second pressure switch P2, associated with B2, will have monitored the pressure in the manifold and will have verified that the pressure has risen to Pmax1. Therefore, it will be possible to know which should be the first to start up in the next cycle. Moreover, the first pressure switch P1 will know that the pressure Pmax1 with B1 in operation has been reached. Then it will be possible to know which should be the second to start up, if necessary. The change of status configurations is represented by arrow B1⇆B2 at time t4.

Therefore, the pressure switches can be synchronised based on the knowledge of the pressure read in the manifold and the knowledge of its operating status. Therefore, it is not necessary according to the invention to use a plant or a communication system between pressure switches, but synchronisation is performed by reading a common pressure.

Figure 4:
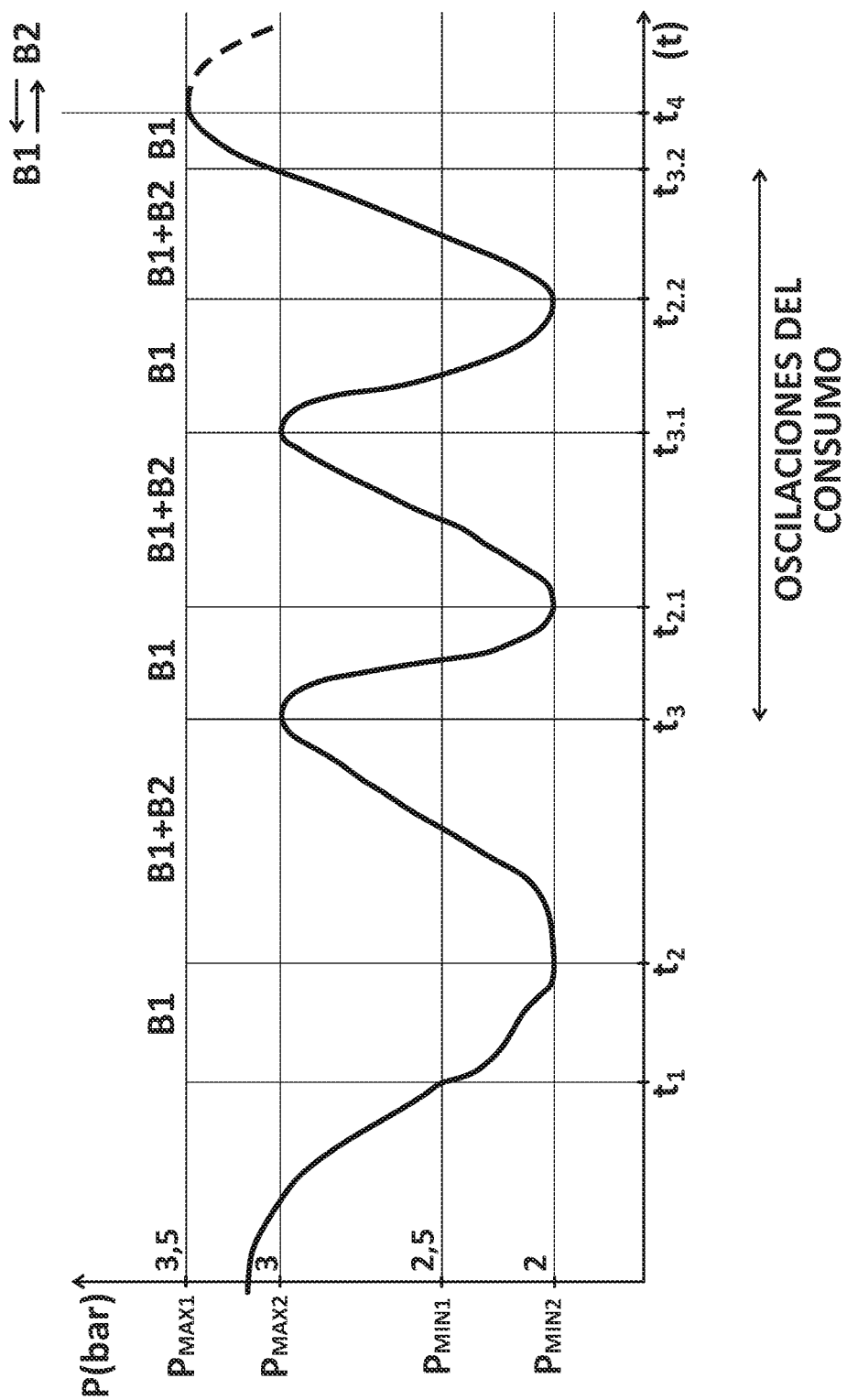
FIG. 4 shows the time evolution of the pressure in a sequence in which the two pumps are started and the auxiliary pump is stopped and successively starts up due to variations in consumption.

Case 3:

Starting from the situation of case 2 after time t3 (B2 shut down), if the demand reverses its course and increases again until the pressure drops below Pmin2, pump 2 starts up again as happens at times t2.*n*. This situation can last until reaching the conditions of time t4. This sequence corresponds to the case known and shown in FIG. 4, in which the period of time in which fluctuations in consumption occur have been highlighted.

Case 4:

After completing a cycle in Case 1 or Case 2 and Case 3 the order of start-up of the pumps is reversed, that is, the master device will act as auxiliary and the slave device as the main one.

Figure 3:
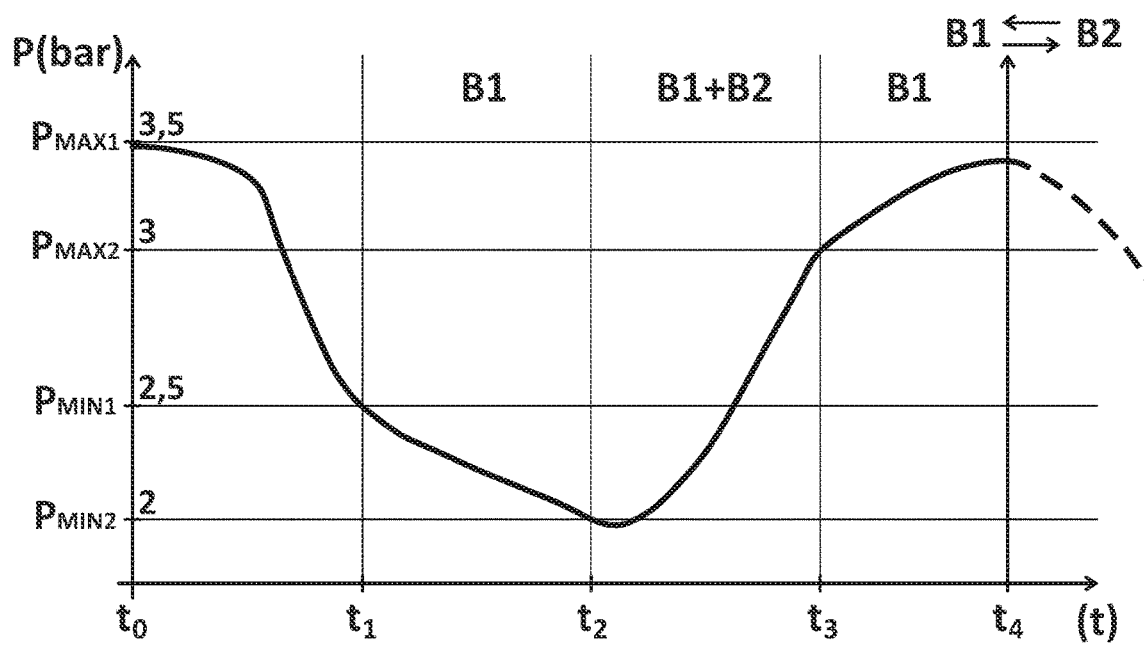
FIG. 3 shows the time evolution of the pressure in a sequence in which the two pumps are started.

Under these conditions, if the work cycle is carried out under the conditions described in FIG. 2 or FIG. 3, in terms of the sequence of pressures and with the new order of pumps, there will be no alteration in the logic of normal operation.

Case 5:

Because the decisions associated with the change in the start-up order are linked to the pressure reading of each device, a margin of tolerance must be given to said reading in the case that small calibration deviations occur.

This tolerance can cause the auxiliary device to misinterpret the stopping of the main device. This would create a change in the alternation causing both devices to work in auxiliary mode (desynchronisation).

To solve this problem the master device, after 2 consecutive start-ups in Pmin2, applies a resynchronisation algorithm.

It is an algorithm that detects N (for example two or three) consecutive start-ups of the master pump as auxiliary.

In particular, the master pump working as an auxiliary after two consecutive start-ups does not shut down in Pmax2 as it would correspond, but stops in Pmax1, which forces the auxiliary pump to reverse its order and return both to alternating state, that is, as a cycle like the one described in FIG. 2.

Although in the above description of preferred embodiments the application of the invention to a system provided with two pumps has been described, it is evident that the invention can be applied to a larger number of pumps, with the relevant changes. If, for example, there is a third pump, a third start-up pressure and a third shut-down pressure must be defined. Regarding the alternating algorithms, a cyclical strategy will be used, always with the objective of ensuring the same long-term workload of the three pumps.

Figure 6A:
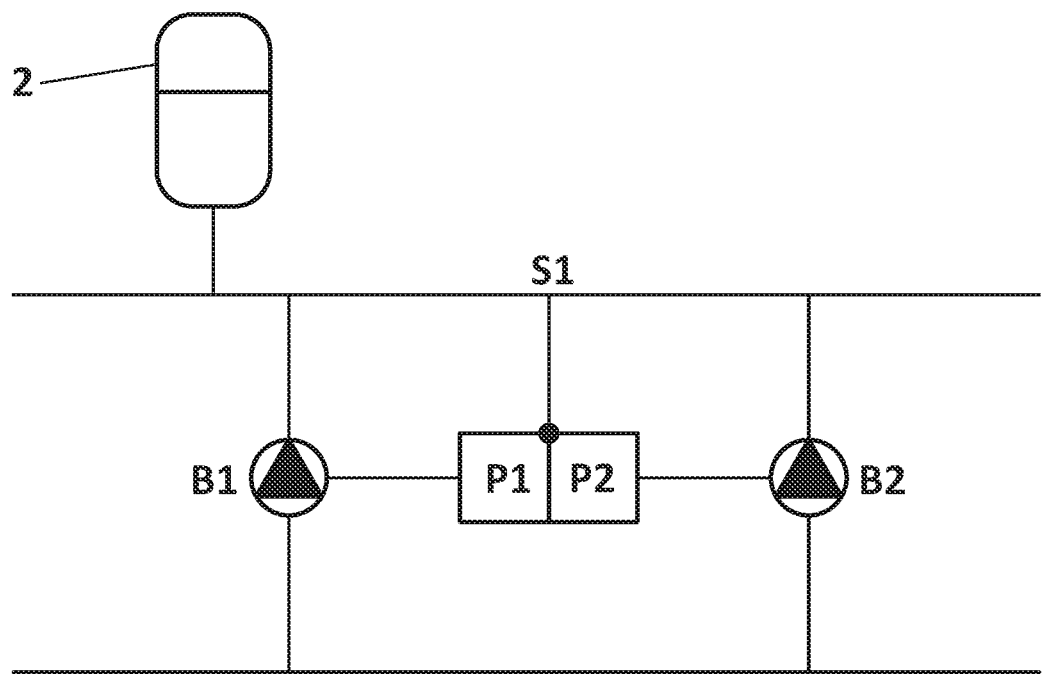
FIGS. 6a and 6b show diagrams of embodiments in which the two pressure switches are in the same housing, to facilitate the installation thereof.
Figure 6B:
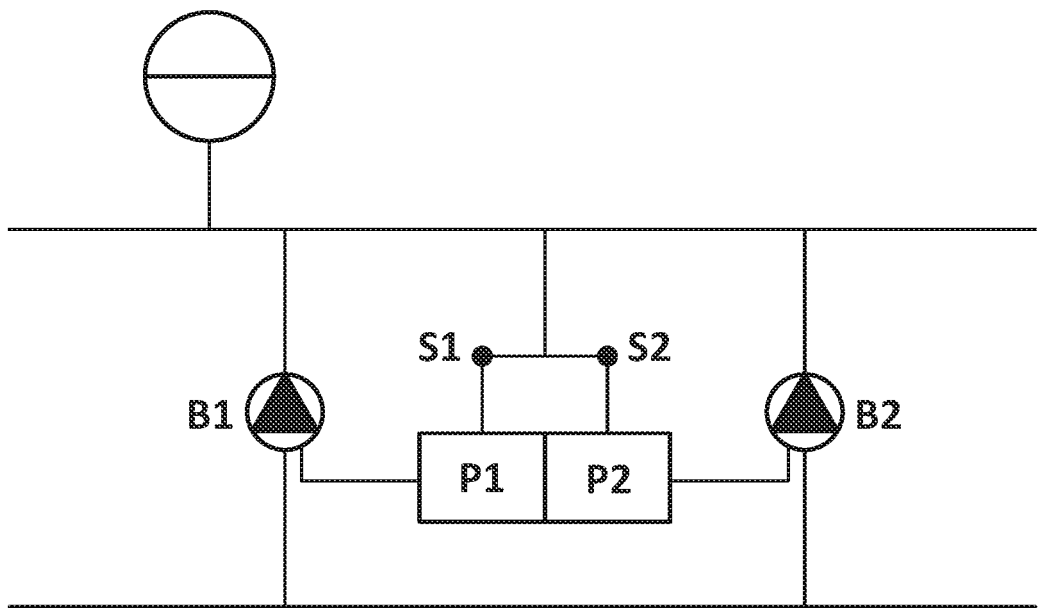

Finally, FIGS. 6a and 6b show two embodiments in which the two pressure switches are presented in a common housing, with two pressure points or only one.

Up to this point, a system has been described in which there are two pumps that complement each other in order to meet the flow needs, so that one or both of them work, and in which the one that will work alone is alternating.

Figure 7:
FIG. 7 shows the configuration pressures and the relative value thereof in the case of a system of two pumps arranged to operate in pure alternation.

A different solution is described below, with reference to FIGS. 7 to 9, in which the pumps never work simultaneously, but they work in a so-called pure alternating mode, that is, either one works or the other works.

As already indicated in the background section, to achieve pure alternation, the systems of the state of the art are based on the incorporation of a central control unit that must be connected to both pumps.

Now, as will be explained below, according to the present invention, it is possible to go without a control centre, because if each of the pressure switches (each pump has one) has a pressure sensor, it is possible to carry out a two-pump system with pure alternation only through the pressure reading in the common delivery manifold.

For this, a system with two pumps B1 and B2, as in the system described above, is once again available. The two pressure switches P1 and P2 are configured as master.

At the moment of putting the system into tension, the selected pump designated as master (for example B1) is configured as the first B1 and the slave as the second B2.

Figure 8:
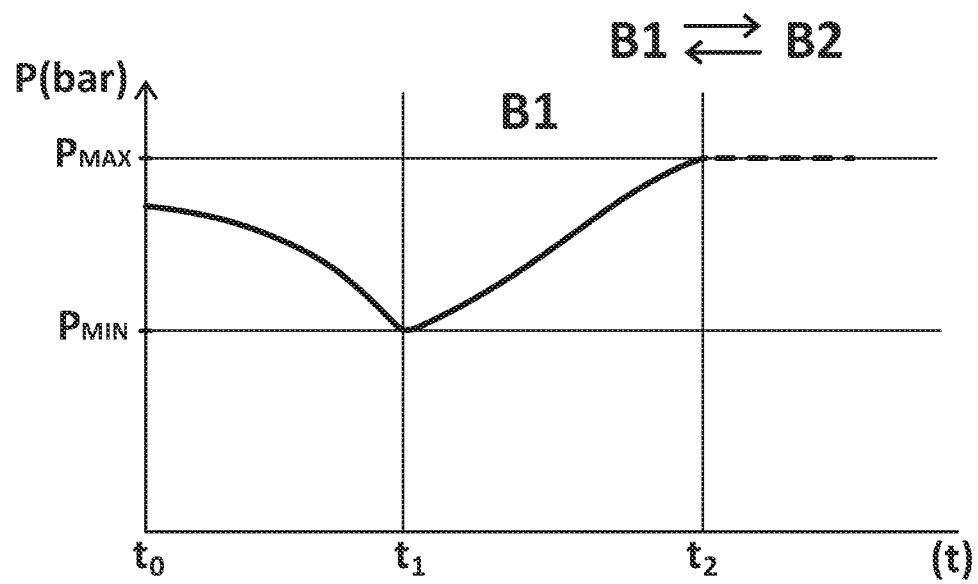
FIGS. 8 and 9 show diagrams of time evolution of the pressure.
Figure 9:
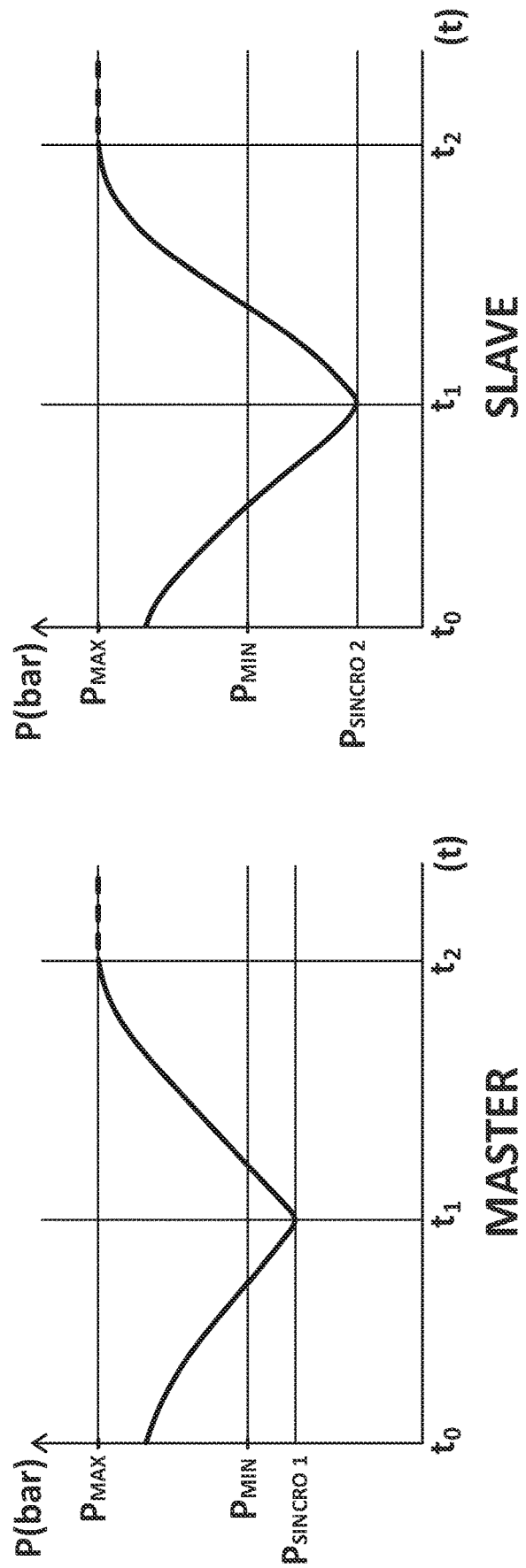

The start-up and shut-down parameters are identical for each equipment, in this case Pmax and Pmin, as shown in the temporary functions illustrated in FIGS. 8 and 9.

In each cycle, only one pump is started from Pmin to Pmax. In the next cycle it alternates the start-up with the second pump.

As shown in FIG. 8, the pump that is stopped, in this case B2, reads the line pressure and can know that the first B1 has been started when the pressure has dropped to Pmin and then has gone up to Pmax. With this information it becomes configured as the first for the next cycle. The pump B1 that has just worked as the first is configured to work as a second.

However, in order to ensure the correct operation of the system, it is necessary to define internal safety pressure levels for each equipment:

For the master pump: Psynchro1<Pmin

For the slave pump: Psynchro2<Pmin

Where always Psynchro2<Psynchro1.

We emphasize that the condition of master or slave does not vary, that is, if B1 is the master it will always be so. The same for B2.

What changes is which pump should be pumped in each cycle, to ensure pure alternation.

The pressures Psynchro1 and Psynchro2 are safety pressures in the case that there is desynchronisation and the two pumps are configured as second or in the case that the pump that has to do the first operation is faulty.

The operation is as follows:

If for some reason there is a desynchronisation, and at that moment the main pump (the one that must pump at that moment, for example B2) does not pump, then the pressure will fall below Pmin. Therefore, when the line pressure drops so much that Pline<Psynchro1 or Pline<Psynchro2, if pump B1 is in second mode (i.e. it is the one that is shut down), then it internally changes its configuration and becomes the first pump (the one that must be started). As the line pressure is lower than Pmin, B1 will start automatically.

Therefore, it is possible to return to a normal operating cycle, because the pump B1 is the one that pumps, and it will do it until Pmax, the pump B2 remaining shut down. Upon reaching Pmax, the B2 pump will become the main pump, which will start up in the next cycle. Pump B1 will become the second pump, which should remain shut down in the next cycle.

In other words, if the pump designated at that time as the main one (not to be confused with master) is not operative, the other pump will not start at Pmin, but will do so at Psynchro1 or Psynchro2 depending on whether it is the master or slave.

That is, by the asymmetry in the configuration consisting of one being master and the other slave, i.e. the first has Psynchro1>Psynchro2, the system can be resynchronised whenever desynchronisation occurs. If those pressures were equal, that would not be possible.

Another possibility offered by this feature is that if one of the pumps breaks down, then the other, only with the reading of pressures, can know that this has happened and can send an error message.

In this text, the word "comprises" and its variants (such as "comprising", etc.) should not be understood in an exclusive sense, i.e., they do not exclude the possibility of that which is described including other elements, steps, etc.

Furthermore, the invention is not limited to the specific embodiments described herein, but rather encompasses the variations that one skilled in the art could make (e.g. in terms of choice of materials, dimensions, components, design, etc.), within the scope of what may be deduced from the claims.

What is claimed is:

1. A system (S) comprising two or more pumps (B1, B2) connected in parallel, a delivery manifold to which outputs of the two or more pumps (B1, B2) are connected, further comprising respective electronic pressure switches (P1, P2) equipped with pressure sensors (S1, S2) connected to the delivery manifold to control the operation of each pump (B1, B2), wherein the electronic pressure switches (P1, P2) are configured to alternate their operation between two or more start-up pressure configurations (Pmax1, Pmax2) and shut-down pressure configurations (Pmin1, Pmin2):

a first configuration with a first shut-down pressure (Pmax1) and a first start-up pressure (Pmin1);

a second configuration with a second shut-down pressure (Pmax2) and a second start-up pressure (Pmin2);

wherein the first shut-down pressure (Pmax1) is greater than the second shut-down pressure (Pmax2) and wherein the first start-up pressure (Pmin1) is greater than the second start-up pressure (Pmin2), wherein the electronic pressure switches (P1, P2) are configured to perform said alternation according to a pressure reading (Pimp) of the delivery manifold with the pressure sensor(s) (S1, S2).

2. The system according to claim 1, wherein the electronic pressure switches (P1, P2) are configured to be put in the first configuration or in the second configuration when the pressure sensor indicates that the first shut-off pressure (Pmax1) has been exceeded a predetermined number of times (N).

3. The system according to claim 1, comprising a boiler (2) connected to the delivery manifold (1).

4. The system according to claim 1, wherein each of the electronic pressure switches (P1, P2) is provided with one of the pressure sensors (S1, S2).

5. The system according to claim 1, comprising a common housing (A) of the electronic pressure switches (P1, P2).

6. A first and second pressure switch (P1, P2) alternating operation between two configurations of shut-down pressure (Pmax1, Pmax2) and start-up pressure (Pmin1, Pmin2), comprising:

the first and second pressure switches being operatively associated with respective first and second pumps;

a first configuration with a first shut-down pressure (Pmax1) and a first start-up pressure (Pmin1);

a second configuration with a second shut-down pressure (Pmax2) and a second start-up pressure (Pmin2);

wherein the first shut-down pressure (Pmax1) is greater than the second shut-down pressure (Pmax2) and wherein the first start-up pressure (Pmax1) is greater than the second start-up pressure (Pmax2), wherein the first and second pressure switches (P1, P2) is are configured to alternate configurations in response to a pressure reading (Pimp) in a delivery manifold using pressure sensors (S1, S2) connected to the delivery manifold (1).

7. A system (S) comprising:

two pumps (B1, B2) connected in parallel, a delivery manifold to which outputs of the two pumps (B1, B2) are connected, further comprising two respective electronic pressure switches (P1, P2) provided with pressure sensors (S1, S2) connected to the delivery manifold to control the operation of each pump (B1, B2) in an alternating configuration;

wherein the two electronic pressure switches (P1, P2) are configured with the same shut-down pressure (Pmax) and start-up pressure (Pmin), one of the electronic pressure switches (P1) being configured to operate as master and the other electronic pressure switch (P2) configured to operate as a slave, wherein the electronic pressure switch (P1) configured to operate as a master includes a synchronization pressure (Psynchro1) different from a synchronization pressure (Psynchro2) of the electronic pressure switch (P2) configured to operate as a slave, and wherein the synchronization pressures (Psynchro1, Psynchro2) are lower than the start-up pressure (Pmin) and lower than the shut-down pressure (Pmax) to return the system to the configuration of alternating operation between pumps when the alternating configuration is lost and one of the synchronization pressures is reached.

8. The system according to claim 7, comprising a boiler (2) connected to the delivery manifold (1).

9. The system according to claim 7, wherein each of the electronic pressure switches (P1, P2) is provided with a one of the pressure sensors (S1, S2).

* * * * *